United States Patent [19]

Hohner et al.

[11] 4,028,468
[45] June 7, 1977

[54] OAT GROAT FRACTIONATION PROCESS

[75] Inventors: Gary Arlyn Hohner, Sleepy Hollow; Roy Godfrey Hyldon, Crystal Lake, both of Ill.

[73] Assignee: The Quaker Oats Company, Chicago, Ill.

[22] Filed: Oct. 1, 1975

[21] Appl. No.: 618,476

[52] U.S. Cl. .................. 426/436; 426/656; 426/463; 426/507
[51] Int. Cl.² .......................... A23J 1/12
[58] Field of Search .......... 426/436, 598, 655, 656, 426/458, 460, 462, 463, 464, 507, 508, 567

[56] References Cited

UNITED STATES PATENTS

| | | | |
|---|---|---|---|
| 2,355,029 | 8/1944 | Musher | 252/1 |
| 2,355,547 | 8/1944 | Musher | 426/567 |
| 2,414,117 | 1/1947 | Musher | 426/436 X |
| 2,554,873 | 5/1951 | Musher | 426/436 X |
| 3,241,978 | 3/1966 | Hreschak | 426/457 |
| 3,770,452 | 11/1973 | Finley | 426/436 X |
| 3,790,553 | 2/1974 | Rao et al. | 426/436 X |
| 3,828,017 | 8/1974 | Finley et al. | 426/436 X |
| 3,846,397 | 11/1974 | Ernster | 426/436 X |
| 3,857,987 | 12/1974 | Rogols et al. | 426/436 |
| 3,859,451 | 1/1975 | Saunders et al. | 426/481 X |
| 3,868,355 | 2/1975 | Rodgers | 426/460 |

OTHER PUBLICATIONS

Perry's Chemical Engineers' Handbook, 4th Edition, Published by McGraw–Hill Book Co., 1963, pp. 21–51.

Primary Examiner—Frank W. Lutter
Assistant Examiner—N. Greenblum
Attorney, Agent, or Firm—Mathew R. P. Perrone, Jr.

[57] ABSTRACT

Oat groats are ground to form a coarse branny fraction, and a fine fraction. The coarse fraction is separated, formed into a slurry, and subjected to an extraction and separation process to isolate oat gum and oat protein together with other by-products.

18 Claims, No Drawings

OAT GROAT FRACTIONATION PROCESS

BACKGROUND OF THE INVENTION

This invention relates to grain fractionation and more particularly to fractionation of an oat groat by isolating the coarse branny part of a ground oat groat and extracting oat gum, oat protein, and other by-products from the coarse fraction.

Fractionation of any grain — and especially the oat grain — is beneficial because each fraction of the grain is usually more valuable than the whole grain itself. The oat seed from which the oat grain is taken comprises an oat hull and an oat groat. The oat hull serves as an outer covering of the groat. The oat groat is comprised of oat bran, including the pericarp and the aleurone layers, germ and endosperm. It is desirable to fractionate the oat groat to obtain oat gum, oat protein, and by-products.

It is well known in the art how to clean, dry, and dehull whole oats. It is further well known to dry the resulting dehulled oat groats under controlled conditions relating to temperature and time. These conditions permit the inactivation of lipolytic enzyme activity which is concentrated in the bran layers of the oat. Such an inactivation retards the subsequent development of rancidity of the oat oil after the groat is ruptured during processing. The controlled conditions of time and temperature during drying are selected to minimize gelatinization of the starch present in the endosperm and other functional changes in the groat.

It is also known to grind the oat groat to separate the bran layers from the starchy portion of the endosperm. This grinding results in a flour comprising two general types of particles. A first type of particle is a small regular shaped spherical particle which basically originates from the starch endosperm. A second type of particle is a more irregularly shaped particle which largely originates from the bran layer or from the endosperm near the bran layer. Particles containing the bran particles or multiple starch granules cemented together by oat gum or protein tend to be less dense and/or more irregularly shaped than the free starch particles from the starch endosperm which tend to be dense and compact. These particles are generally spherical in shape but not necessarily a perfect sphere. These physical distinctions between the particles of the flour formed by grinding the oat groats lend themselves to air classification and separation. Air classification separates the flour by suspending the particles in air and separates on the basis of density, size, and shape. The dense compact particles separate as fines, and the irregular particles separate as a light, coarse flour from air classification.

A major portion of both the oat protein and the oat gum separate on air classification with the coarse oat flour. It is possible to concentrate an even greater portion of oat gum and oat protein in the coarse oat flour if the air classification step and size reduction steps are preceded by extraction of a major part of the lipid faction from the oat groat. The oat groat is rolled to form flakes. The lipid faction is extracted from the flaked oat groat by use of techniques and solvents well known in the art of oil-seed extraction. Specifically, the use of normal hexane extraction in a standard oil-seed extraction process reduces the residual oat lipid in the groat to less than 1 percent. The lipid faction thus removed from the oat groat is generically known as crude oat oil. The crude oat oil usually comprises about 6 percent to about 10 percent by weight of the groat. Removal of this crude oat oil from the groat provides the better classification of the oat protein and the oat gum with the coarse fraction.

Thus it can be seen that oat gum and oat protein can be concentrated into the coarse oat flour by procedures known in the art. Further treatment of the coarse oat flour to isolate gum, protein, and starch is difficult. Enzymes naturally present in the oat groat for the purpose of hydrolyzing the oat gum during the natural process of germination interfere with the separation of the gum. The controlled heating and drying treatment to inactivate lipolytic enzymes in the oat groat leaves a residual glucosidase activity. This enzyme thus remains to interfere with the recovery of the oat gum.

For example, if the coarse oat flour is hydrated to extract the oat gum as is commonly done with other oil-seeds to extract proteins, the native enzymes immediately hydrolyze the oat gum so that it can be neither recovered nor useful. If the coarse flour is hydrated in hot water to inactivate the enzyme, the oat starch present in the coarse oat flour is gelatinized, and thus becomes inseparable from the hydrated gum. So either the enzyme or the starch interferes with the hydrated gum.

Furthermore, the separation of the proteins from the coarse portion is rendered difficult. Not only must gelatinization of the starch be avoided, but hydrolysis of the oat gum must also be avoided. These reactions are opposite reactions. If one reaction is favored, the other reaction takes place to interfere with the fractionation. Oat gum is a water soluble carbohydrate. It is a high molecular weight polymer of glucose with alternating cycles of 2 beta-1,4 linkages followed by two to four alpha-1,4 linkages. Oat gum differs from other polymers of glucose by those specific linkages present between the glucose molecules. For example, in starch, alpha-1,4 linkages with branched chains on the polymer connected with alpha-1,6 linkages are present. In cellulose, the glucose monomer is polymerized with beta-1,4 linkages. This combination of linkages in the oat gum renders the oat seed specifically susceptible to the enzymes present in the hull and groat during germination of the oat seed. The gum is rapidly hydrolyzed to glucose as it becomes hydrated. The resulting glucose provides the energy for the germinating process. Thus it can be concluded that many conventional techniques for separation of cereal components cannot be successfully applied to separate pure oat gum in an intact polymeric form.

Oat protein exists in the oat groat at about 14 to about 22 percent on a dry basis by weight. It is well known that oat protein has a higher nutritional value than other cereal proteins because of the larger and more balanced concentration of the amino acids. Amino acids are essential to human life because they are the basic materials for forming the required protein. If the oat protein is isolatable, one has a suitable material for adding protein content to a variety of foods or forming a desirable protein component.

Thus it may be seen that the physical and bio-chemical composition of the oat grain renders it difficult to separate oat gum, oat protein, and by-products in relatively pure form. It, therefore, becomes obvious that fractionation of the oat seed is a difficult and complex problem having many interfering factors which prevent the effective fractionation of the groats.

SUMMARY OF THE INVENTION

Therefore, it is an object of this invention to provide a process for fractionating an oat seed.

It is a further object of this invention to provide a process for fractionating an oat seed which avoids the interfering properties within the oat itself.

It is a further object of this invention to provide a process for isolating bran from an oat seed.

Yet a further object of this invention is to provide a process for isolating a starch-containing component from an oat seed.

Also an object of this invention is to provide a process for isolating a protein-containing component from an oat seed.

Another object of this invention is to provide a process for isolating gum from an oat seed.

Yet another object of this invention is to provide an oat gum.

Still another object of this invention is to provide an oat starch-containing component.

A further object of this invention is to provide an oat protein flour.

Yet a further object of this invention is to provide an oat bran.

These and other objects of this invention are met by providing an extraction of the air classified, coarse bran fraction of the oat groat at high pH and adjusting the pH and temperature of the extraction process accordingly.

DESCRIPTION OF THE PREFERRED EMBODIMENTS

Oat components including oat protein, oat starch, oat gum and oat bran are extracted from the coarse oat flour obtained from air classification of a whole oat groat flour or defatted whole groat flour, by high pH, water extraction at moderate temperatures.

Basically the processes of obtaining relatively pure oat components from the coarse oat flour include forming a slurry of the flour in water, adjusting the pH of the slurry to a range of about 8 to about 10, solubilizing the soluble components of the coarse flour, separating the extracted bran from the slurry and recovering the soluble components from the alkali extract of the slurry.

An especially suitable way of obtaining a pure oat gum from the coarse oat flour fraction is to treat the groat before grinding. This treatment of the oat removes the major portion of the lipid fraction from the oat groat prior to grinding is well known in the art. This process is substantially set forth above.

Under optimum conditions, following extraction of the crude oat oil, it is possible to concentrate approximately 50 percent of the total protein, 80 to 85 percent of the crude fiber and essentially all of the detectible oat gum in the coarse fraction comprising 30 to 35 percent of the original groat based on the weight of the groat.

The slurry is generally formed with a concentration of about 1 to about 10 percent by weight of the slurry being solids. The solids are formed from the coarse oat flour. More preferably, about 2 to about 6 percent by weight of the slurry is solids. The most effective extraction of the soluble components from the oat flour is found when the bran comprises about 4 to about 6 percent by weight of the slurry.

The pH is adjusted between 8 and about 10 by the use of a food grade base. More particularly, the food grade base is sodium carbonate. Other suitable food grade bases include sodium hydroxide, calcium hydroxide and mixtures thereof. The control of pH is especially critical in this invention. It must be high enough to solubilize the oat protein and oat gum but not so high as to gelatinize the oat starch. Likewise the native enzyme or enzymes which hydrolyze the oat gum have maximum activity at acidic pH and little or no activity at the optimum alkaline pH for extraction. More particularly, the pH is adjusted between about 9 and 10. Most particularly, the preferred pH is about 9.2 to about 9.6.

Another feature for extraction includes temperature of the slurry. The temperature is controlled to maximize the solubility of oat gum and protein, while minimizing damage to the starch. The temperature of the slurry is adjusted either by heating the alkaline water before the slurry is formed, or heating the slurry after it is formed. Most effective control of the temperature of the slurry is accomplished by continuous automatic feedback control of a heat exchanger through which the slurry is circulated. The temperature is controlled between 30° and 60° C. or more particularly between 40° to 50° C.

Once the pH and temperature of the slurry are adjusted approximately, the extraction process starts. The slurry may be treated in any suitable way to accomplish the extraction so long as agitation is sufficient. Most preferably the slurry is subjected to a high-shear extraction process. High-shear conditions may be applied by rapid stirring or more preferably by pumping the slurry rapidly through an inline wet grinder and recirculating to a supply tank. More than one stage of extraction may be desired to effect maximum removal of soluble components. This can be accomplished by separating the oat bran from the slurry in any suitable fashion and reslurrying the bran in at least one fresh solution.

While it is not desired to be bound by any particular theory, the following postulate is offered to suggest a possible explanation for the function of this process. It is believed that the above described conditions of concentration temperature, pH and shear rate define conditions wherein oat protein and oat gum are readily soluble; while at the same time the native enzymes, which can hydrolyze the oat gum have minimum activity, and the oat starch is not gelatinized or damaged. These conditions facilitate the extraction of soluble components and oat starch from the oat bran.

After the slurry is subjected to extraction treatment, the slurry contains three components. A first component is the extracted bran. A second component is a viscous liquid. The bran is a relatively coarse flake. The third component in the slurry is the fine particle oat starch having a particle size of about 5 to 10 microns. The starch is generally in the fine particle size because it has not been heated to a suitable temperature for gelatinizing, which would render it not separable from the hydrated gum. Thus, the starch remains in fine particle physical state. The liquid has a viscosity ranging from about 60 to 80 centipoises at 40° C. The viscosity is due to the presence of the hydrated gum and protein in the water. The hydrated gum and protein are extracted from the bran by the earlier referenced extraction process. These three phases are present after the slurry is subjected to extraction.

After the extraction process, it is possible to separate the bran from the rest of the slurry. Any suitable separation process is operable. A preferred method of separating the extracted bran from the alkaline slurry is by centrifugation. The centrifugation applied to separate the bran from the slurry has a gravity field in the range of 2,000 to 4,000 times Earth gravity. The gravity force range is relatively low because it is desired at this point to separate only the bran from the slurry. It is desired to leave the fine particle oat starch in the supernatant. However, if it is desired to remove the fine particle oat starch at this point, a higher gravitational force centrifugation is used. The higher force centrifugation is required to remove the fine particle oat starch because the fine particle tends to remain in the viscous liquid of the slurry.

The viscous liquid of the slurry is an alkaline extract obtained by extraction of the bran. As is above noted, this alkaline extract is heated to approximately 40°–50° C. It is now desired to recover oat protein from the alkaline extract together with the oat starch. This recovery process is carried out by cooling to at least ambient temperature. While ambient temperature is operable, the most effective recovery of the oat protein occurs when the alkaline extract is chilled to less than about 5° C. but above the freezing point of the liquid. In combination with the cooling, acidification is also required. Acidification is carried out with any suitable food grade acid. Typical food grade acids include hydrochloric acid, phosphoric acid, citric acid, or malic acid. The pH of the alkaline extract is adjusted to a range of about 4.5 to 4.8 while chilled. More preferably, the pH is about 4.6 for maximum precipitation of the oat protein. The best results for achieving precipitation of the oat protein require that the chilling occur first before the acidification because the acid tends to activate enzymes which hydrolyze the gum, in the heated slurry. If the oat gum is hydrolyzed, it is effectively destroyed and cannot be recovered at a later stage of the process because it cannot be precipitated by alcohol. Chilling slows the hydrolysis of oat gum sufficiently to permit separation. This chilled, acidified extract is centrifuged at a gravitational force range of 6000 to 7000 times the Earth's gravitational force to remove essentially all of the oat starch and most of the oat protein from the solution. Upon this removal, a hydrated oat gum remains in solution.

The solids removed can be neutralized to any desired pH and dried by any suitable method to provide oat protein flour of approximately the composition as shown in Table I.

TABLE I

| Oat Protein Flour Composition made from Dal Oats | |
|---|---|
| | Dry Basis |
| Protein (N × 5.83) | 55 % |
| Fat | 3 % |
| Fiber | .4 % |
| Ash | 1.7 % |
| Carbohydrate | 39.9 % |

To recover the oat gum from the solution remaining after the oat protein flour is precipitated therefrom, careful handling is required to maximize the amount of oat gum recovered. First the acidified supernatant is neutralized by adding any suitable edible base to a pH between about 7.0 and about 8.5. More preferably the pH range of the supernatant is 8.2 to 8.5. After neutralization, the solution is heated to a temperature of at least 90° C. to finally denature and inactivate any remaining enzymes.

Prior to inactivation of the enzymes it is critical that the solution be kept chilled while it is acidified to precipitate the oat protein. It is also critical that the total elapsed time that the solution is at acidic pH must be minimized. Glucosidase enzymes which are capable of gum hydrolysis have maximum activity at acidic pH. This activity can be minimized by chilling the solution to minimum temperatures and minimizing the total exposure time.

It is also critical for the recovery of a pure oat gum that all of the oat starch be removed from the gum solution with the oat protein flour. Subsequently the gum solution is heated to denature the remaining enzymes. If any starch remains in the solution it is gelatinized by heating and cannot subsequently be removed from the oat gum.

After inactivation of the remaining enzymes the oat gum solution is concentrated by evaporation of approximately one-half of the solution volume to concentrate the gum solids to about 3.0 to 3.5 percent of the solution by weight.

Oat gum is precipitated from solution by mixing equal weights of concentrated gum solution with isopropyl alcohol of azeotropic concentrations. This yields a solution of approximately 40 percent isopropyl alcohol. At least 35 percent isopropyl alcohol is required to precipitate the gum. The oat gum precipitates and can be recovered by filtration or centrifugation to yield a relatively pure oat gum with less than 3% protein on a dry basis. Other alcohols suitable for use as a replacement for isopropyl alcohol are n-propyl, ethanol; and methanol. Any suitable mixture of alcohols may also be used.

This process is applicable to any type of oat grain. However, a high protein, high lipid variety is the best for this process. The Dal oat variety is a particularly suitable oat.

Having thus described the invention, the following example is offered to illustrate without unduly limiting the invention. Unless otherwise specified, all parts and percentages are by weight.

EXAMPLE

Oat groats are dried, steamed and flaked to a thickness of 0.012–0.014 inch by passing between smooth rolls. The flakes are extracted with normal hexane for approximately ¾ hours to reduce the residual lipid concentration to approximately one percent. The oat flakes are subsequently desolventized by vaporization of the hexane into air. The flakes are tempered to approximately 12 percent moisture and ground on a hammermill or pin mill to produce a flour with two major groups of particles. Approximately two-thirds of the flour is in particles less than 45 micron in major dimension, and approximately one-third of the flour is in particles larger than 200 microns.

The flour is air classified to separate the coarse fraction from the fine fraction. Typical compositions of the two fractions are given as follows on a dry basis.

| | Coarse | Fine |
|---|---|---|
| Protein (N × 6.25) | 27.3 % | 12.3 % |
| Fat | 4.6 % | .7 % |
| Fiber | 4.8 % | .7 % |
| Ash | 4.9 % | 1.1 % |
| Carbohydrate | 58.4 % | 82.2 % |

The solvent extracted, air classified coarse fraction, comprising approximately 33 percent of the original groat is fed to an extraction tank at 100 pounds per hour. About 180 gallons per hour of heated water and 2 pounds per hour of sodium carbonate as soda ash are fed continuously to the same tank. This concentration of sodium carbonate results in a pH of about 9.2. The resulting slurry of 6 percent solids is temperature controlled to a range of 40 to 45° C. by heating of the water feed. Oat gum oat starch, and oat protein are extracted from the bran by recirculating the slurry through an external wet grinding loop at about 800–900 gallons per hour, with constant stirring of the tank slurry. Minimum hold time in the tank is one hour.

The bran is separated from the slurry by passing it through a horizontal solid-bowl, decanting centrifuge at the rate of 120 gallons per hour. The bran at about 18 percent solids is continuously discharged at the rate of about 147 pounds per hour directly to a second tank. The bran is continuously diluted to about 6 percent solids with the addition of 82.5 gallons of heated water per hour and 0.14 pounds per hour of soda ash. Again the temperature is maintained at 40° to 45° C. The resulting slurry is recirculated through the wet grinder as in previous steps. Additional gum, starch and protein are extracted from the bran. The final bran product is removed from the slurry by centrifugation as in the previous steps. The bran discharge rate is 207.7 pounds per hour at 28 percent solids. The wet bran sludge is pumped to a drum dryer and dried bran is recovered.

The liquids from the first, second and third extractions are chilled to 4° C. and combined. Then the liquid is acidified to a pH of 4.6 with the addition of hydrochloric acid. The precipitation of the protein then proceeds, and the precipitated protein and starch are removed from the gum containing solution by centrifugation. The liquid is pumped at 60 gallons per hour to a disk-desludging centri-fuge. The starch-protein sludge is recovered. At this point the starch is virtually completely removed from the solution. The starch-protein sludge is neutralized and spray dried to yield an oat, high-protein flour having at least about 50 percent protein on a dry basis.

The gum solution is continuously neutralized with 0.1 pound of sodium hydroxide per hour in a surge tank. This step must be carried out promptly after centrifuging to avoid enzymatic hydrolysis of the oat gum at acidic conditions. The next step is to concentrate the gum containing solution two to three fold by evaporating at 80° to 90° C. to achieve a solids concentration of about 4 to 5 percent. The concentrated gum solution is then treated with an equal volume of 88 percent isopropyl alcohol, the axeotropic composition. The addition of alcohol must be done with agitation to avoid possible protein precipitation at high localized alcohol concentrations, thus contaminating the gum product. The oat gum may be removed by centrifugation of the alcohol-gum mixture at 60 gallons per hour through a disk-desludging centrifuge. The gum-sludge is discharged at about 1.5 gallons per hour into a wet grinder. After the gum sludge is wet ground, it is further treated with 12.4 gallons per hour of 88 percent isopropyl alcohol in a surge tank with agitation.

The final gum product is removed with a decanting centrifuge at 120 gallons per hour. The sludge is then vacuum-over dried in a rotary vacuum dryer and dry ground to desired particle size. The dried product rate is 11.6 pounds per hour.

The fractions produced by the procedures of this example from oat groats of the Dal variety are typically as follows:

| | Composition (Dry Basis) | | | | |
|---|---|---|---|---|---|
| | Protein % | Fat % | Fiber % | Ash % | Weight % |
| Solvent-extracted Coarse Oat Flour | 29.5 | 3.0 | 4.5 | 4.0 | 100 |
| Oat Bran | 19.1 | 5.5 | 13.8 | 11.7 | 30.5 |
| Oat Protein Flour | 55.0 | 3.0 | .4 | 1.7 | 30.5 |
| Oat Gum | 1.5 | — | — | 4.0 | 17.5 |

The fractions produced by the procedures of this example for regular oat groats are typically as follows:

| | Composition (Dry Basis) | | | | |
|---|---|---|---|---|---|
| | Protein % | Fat % | Fiber % | Ash % | Weight % |
| Solvent-extracted Coarse Oat Flour | 27.3 | 4.3 | 4.9 | 4.9 | 100 |
| Oat Bran | 15.5 | 7.5 | 11.5 | 8.6 | 40 |
| Oat Protein Flour | 51.8 | 3.8 | 0.5 | 2.4 | 23.3 |
| Oat Gum | 1.0 | — | — | 2.5 | 6.6 |

Having thus fully described and set forth the invention, what is sought to be secured and protected by Letters Patent of the United States is:

1. In a process of fractionating oats comprising:
   I. obtaining dried, dehulled oat groats;
   II. grinding the oat groats to form an oat flour containing a dense, fine fraction of regularly shaped particles and a light, coarse fraction of irregularly shaped particles wherein the coarse fraction comprises oat bran, oat gum, oat protein and oat starch;
   III. recovering the flour;
   IV. separating the coarse fraction and the fine fraction;
   V. recovering the coarse fraction; the improvement further comprising:
      a. forming a heated, basic slurry of the recovered coarse fraction of the oat flour in a liquid;
      b. agitating the heated, basic slurry to carry out an extraction and to form a bran fraction and a soluble fraction containing the oat gum, the oat protein and the oat starch by the extraction of the coarse fraction;
      c. recovering the oat bran from the slurry while leaving the oat gum, the oat protein, and the oat starch in the soluble fraction to thereby form an alkaline extract of the soluble fraction;
      d. chilling the alkaline extract to a temperature in the range from above the freezing point of the alkaline extract to ambient temperature;
      e. acidifying the chilled alkaline extract to form a precipitate of oat protein;
      f. removing the protein precipitate and the starch from the extract to form a supernatant liquid containing the oat gum to thereby recover the protein precipitate and the starch;
      g. neutralizing the supernatant liquid;
      h. heating the neutralized supernatant liquid to at least 90° C.; and
      i. recovering the oat gum.

2. The process of claim 1 wherein the extraction is accomplished by:

a. adjusting the pH of the slurry to a range of about 8 to about 10;
b. heating the slurry to a temperature between 30° C. and 60° C.;
c. agitating the slurry under high shear conditions to separate the coarse fraction into a bran fraction; and a soluble fraction, wherein the soluble fraction contains a solution of the oat gum, and the oat protein, and the oat starch in the liquid of the slurry; and
d. separating the bran fraction from the slurry to form the alkaline extract containing oat gum, oat protein and oat starch.

3. The process of claim 2 wherein the bran is separated from the slurry by centrifuging the slurry at a force equal to about 2000 to about 4000 times the force of Earth's gravity.

4. The process of claim 2, wherein the separating removes both the bran and the oat starch from the slurry together by centrifuging the slurry at a force equal to 6,000 to 7,000 times Earth's gravity, thereby leaving the oat gum and the oat protein in solution.

5. The process of claim 1 wherein a lipid fraction is present in the oat groat, and the extraction is accomplished by removing the lipid fraction from the oat groat prior to the grinding of the oat groat to form the fine fraction and the coarse fraction.

6. The process of claim 5 wherein the chilling of the alkaline extract is to a temperature in the range of from above the freezing point of the alkaline extract to about 5° C.

7. The process of claim 4 wherein the recovery of oat gum is accomplished by:
a. concentrating the oat gum in the supernatant liquid; and
b. precipitating the oat gum from the supernatant liquid.

8. The process of claim 7 wherein the concentrating is accomplished by evaporating the supernatant liquid to a point where the supernatant liquid contains at least 2% gum by weight of the liquid.

9. The process of claim 7 wherein the precipitating of the oat gum is accomplished by mixing the concentrated supernatant liquid with isopropyl alcohol, and the oat gum is recovered.

10. The process of claim 6 wherein the precipitate of the oat protein is neutralized and dried to form an oat protein flour.

11. The process of claim 6 wherein at least one gum fraction is formed wherein the oat bran separated in step c) of claim 1 is used as a feed material in step a) of claim 1.

12. The process of claim 1 wherein:
a. the slurry is a water slurry having a solids content about 1 to about 10% by weight of the slurry;
b. the pH of the slurry is adjusted between 8 and about 10 by using a food grade base selected from the group consisting of sodium carbonate, sodium hydroxide, calcium hydroxide and mixtures thereof;
c. the temperature of the slurry is between 30° C. and 60° C. prior to extraction; and
d. the extraction comprises:
1. agitating the slurry under high shear conditions to form three components uniformly dispersed in the slurry wherein the three components comprise extracted bran, a viscous liquid having a viscosity of 60 to 80 centipoises at 40° C. and containing the oat gum and the oat protein in solution, and fine particles of the oat starch having a particle size of about 5 to 10 microns;
2. separating the extracted bran from the slurry by centrifuging the slurry at a force 2,000 to 4,000 times Earth gravity — the viscous liquid thereby becoming an alkaline extract having the fine particles of the oat starch dispersed therein;
3. recovering the extracted bran
4. chilling the alkaline extract to less than 5° C. but above freezing;
5. acidifying the alkaline extract to a pH of about 4.5 to 4.8 with a food grade acid to precipitate oat protein;
6. centrifuging the chilled acidified extract at a force in the range of 6,000 to 7,000 times Earth's gravitational force to thereby remove essentially all of the oat starch and most of the oat protein from the extract and leave the oat gum in solution to form a supernatant;
7. recovering the oat starch and the oat protein;
8. neutralizing the supernatant to a pH of about 7.0 to about 8.5;
9. heating the supernatant to at least 90° C. to thereby denature and inactivate any remaining enzymes;
10. evaporating the supernatant to form a solution containing 3.0% to 3.5% by weight oat gum;
11. adding at least 35% alcohol by weight of the solution wherein the alcohol is selected from the group consisting of isopropyl alcohol, n-propyl alcohol, ethanol, methanol, and mixtures thereof to precipitate the oat gum; and
12. recovering the oat gum.

13. The process of claim 12 wherein the pH of step (b) is 9.2 to 9.6.

14. The process of claim 13 wherein the temperature of step (c.) is 40° to 50° C.

15. The process of claim 14 wherein the pH of step (d.) (5.) is 4.6.

16. The process of claim 14 wherein the pH of step (d.) (8.) is 8.2 to 8.5.

17. The process of claim 16 wherein the alcohol of step (d.) (11.) comprises 40% isopropyl alcohol.

18. The process of claim 12 wherein
I. the extracted bran is subjected to steps (d.)(1.), (d.)(2.) and (d.)(3.) a second time to form a second extracted bran and a second alkaline extract;
II. step (d.)(4.) includes the alkaline extract and the second alkaline extract as a mixture; and
III. steps (d.)(4.) to (d.)(12.) are applied to the mixture.

* * * * *